US005662069A

United States Patent [19]
Smith

[11] Patent Number: 5,662,069
[45] Date of Patent: Sep. 2, 1997

[54] ANIMAL BATHING APPARATUS

[76] Inventor: Leonard Smith, P.O. Box 662, Churchill, Manitoba, Canada, R0B 0E0

[21] Appl. No.: 531,415

[22] Filed: Sep. 21, 1995

[51] Int. Cl.$^6$ .................................................. A01K 13/00
[52] U.S. Cl. ............................................. 119/665; 119/673
[58] Field of Search .................................. 119/665, 668, 119/671, 673, 676, 753

[56] References Cited

U.S. PATENT DOCUMENTS

| | | |
|---|---|---|
| 3,112,498 | 12/1963 | Hoffman . |
| 3,274,974 | 9/1966 | Reynolds ............................. 119/753 |
| 3,734,057 | 5/1973 | Lee et al. ........................ 119/665 X |
| 3,793,987 | 2/1974 | Rogers ............................... 119/161 |
| 4,034,424 | 7/1977 | Budlong ................................ 4/540 |
| 4,056,078 | 11/1977 | Blafford et al. ................... 119/671 |
| 4,057,032 | 11/1977 | Dimitriadis ........................ 119/671 |
| 4,509,461 | 4/1985 | Pack ................................... 119/753 |
| 4,785,486 | 11/1988 | Viesturs ............................... 4/585 |
| 4,807,310 | 2/1989 | Sedala ................................. 4/599 |
| 4,836,144 | 6/1989 | Cole .................................. 119/665 |
| 4,850,997 | 7/1989 | DuBose .......................... 119/665 X |
| 5,148,771 | 9/1992 | Schuett et al. ...................... 119/671 |
| 5,193,487 | 3/1993 | Vogel ................................. 119/676 |
| 5,213,064 | 5/1993 | Mondine et al. ................... 119/671 |
| 5,269,260 | 12/1993 | Farrell et al. ..................... 119/676 |

FOREIGN PATENT DOCUMENTS 2203131  10/1988  United Kingdom .

*Primary Examiner*—Robert P. Swiatek
*Assistant Examiner*—Elizabeth Shaw
*Attorney, Agent, or Firm*—Rudnick & Wolfe

[57] ABSTRACT

An animal bathing unit including a rigid base portion and a panel assembly. The rigid base portion has an upwardly projecting peripheral wall extending completely thereabout to define a relative shallow tub for supporting an animal. The panel assembly is operably associated with the peripheral wall of the base portion. The panel assembly is movable between an upwardly projecting extended position to define an open sided enclosure within which the animal can be contained for bathing, and a collapsed storage position to facilitate storage and transportation of the unit.

20 Claims, 4 Drawing Sheets

ANIMAL BATHING APPARATUS

FIELD OF THE INVENTION

The present invention relates generally to animal bathing devices, and more particularly, to an open-top pet bathing unit which is collapsible and compact for storage and transport.

BACKGROUND OF THE INVENTION

In a typical domestic environment, pets are washed in bathtubs, shower stalls, or laundry tubs or bins. Bathing the pet can be difficult if the pet is frightened, anxious or otherwise difficult to control. It is therefore desirable to provide some kind of barrier or enclosure to assist in restraining the pet. Such a barrier is also useful for blocking water and soap which is shaken off by the pet during the bathing process. When such an enclosure is utilized, it is also desirable to provide a suitable drain for allowing accumulated water to exit the enclosure. When the drain of a bathtub or sink is used, excess shedding of animal hair during the bathing process tends to clog the drain and generally makes sanitation of the bathtub or sink for human use a difficult task. It is therefore desirable to provide a bathing unit for the pet which is separate from a bathtub or shower stall.

When a separate unit is provided, the pet can be bathed at any desired location near a water source, whether it be inside a home or outdoors. The best location for bathing the pet can change over time, depending on such things as the weather and where the pet owner currently lives. Thus, it is desirable to be able to transport and store the bathing unit with the greatest of ease.

Attempts have been made to provide separate bathing units for pets. Such bathing units typically have walls which form an enclosure for retaining the pet and holding water. In order to accommodate large pets, the walls must be relatively large, thus increasing the bulk of the bathing unit and making it cumbersome to transport and store the unit.

Thus, it remains desirable to provide a pet bathing apparatus which is collapsible into a compact unit in order to facilitate transport and storage of the unit.

SUMMARY OF THE INVENTION

In view of the above, and in accordance with the present invention, there is provided a unit for bathing an animal. The unit includes a base portion and a panel assembly. The base portion has an upwardly projecting peripheral wall extending completely thereabout to define a relative shallow tub that supports the animal. The panel assembly is movable between an extended position and a storage position. In the extended position, the panel assembly extends upwardly about the periphery of said base portion to define an open sided enclosure within which the animal can be contained for bathing. In the storage position, the panel assembly is collapsed relative to said base portion to facilitate storage of said unit.

In one form of the invention, a drain is suitably positioned in the base portion, and a drain hose is removably connected to the drain to allow liquid to escape the base portion. Preferably, the panel assembly includes two opposing side panels and a rear panel pivotally connected to corresponding sides of the base portion. The panels are also interconnected in their extended position along adjacent edges thereof. In order to prevent liquid from escaping the unit, seals are preferably provided between adjacent edges of the panels and between adjacent edges of the panels and the sides of the base portion.

Preferably, a plurality of elongated legs are removably connected to the base portion to permit the legs to be removed from the base portion when the legs are in a storage position. The legs are also pivotable between an extended position, wherein the legs support the base portion in an elevated position, and a storage position, wherein the legs are collapsible relative to said base portion to facilitate storage of said unit. Also preferably, the length of each leg is adjustable to vary the height of the unit.

The present invention provides significant advantages over other animal bathing devices. The collapsible components of the present invention provides a compact bathing unit which can be conveniently and easily transported and stored.

The present invention, together with further objects and advantages, will be best understood by reference to the following detailed description taken in conjunction with the accompanying drawings.

DETAILED DESCRIPTION OF THE PREFERRED EMBODIMENTS

Figure 1:
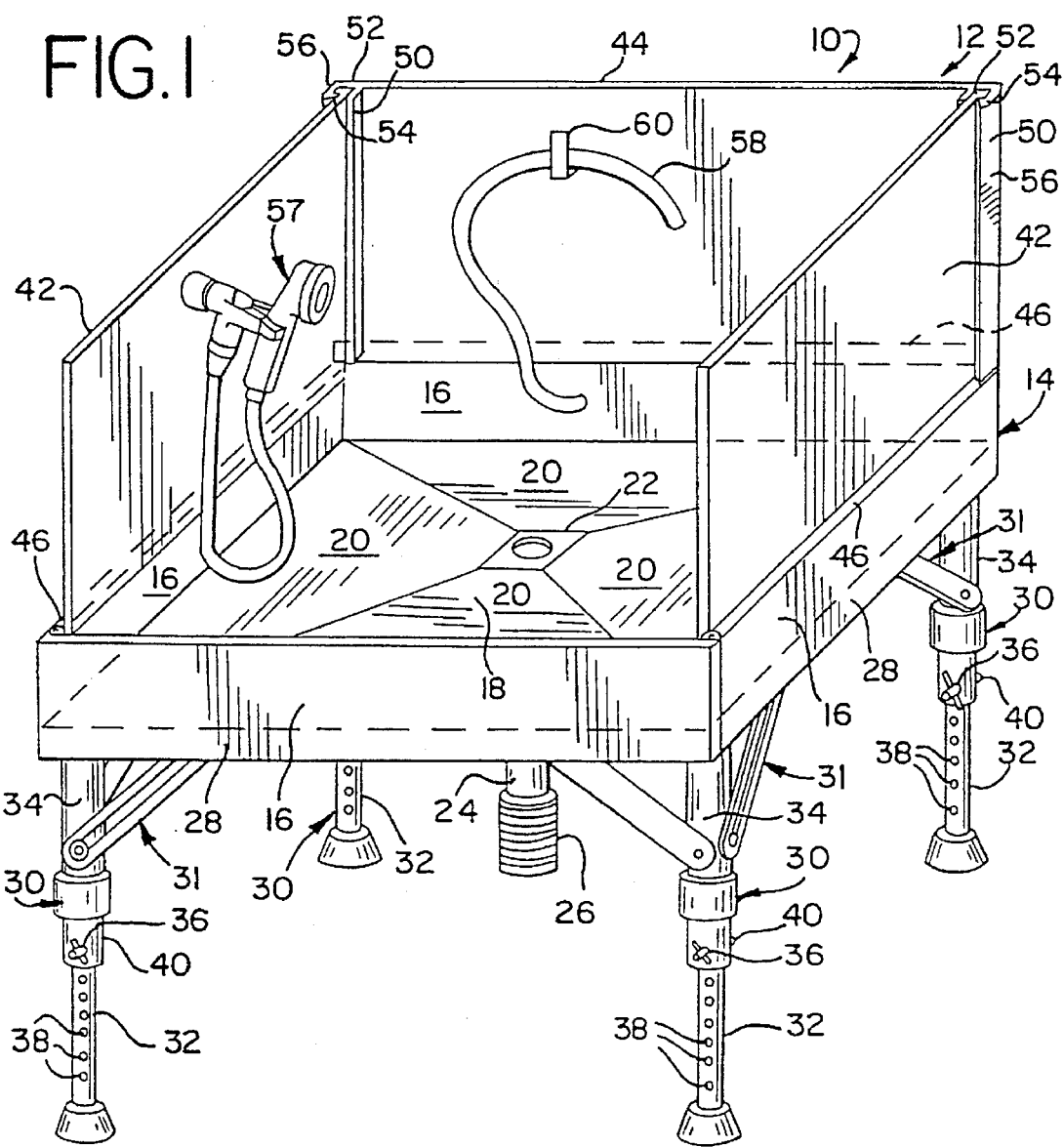
FIG. 1 is a perspective view of an animal bathing unit constructed in accordance with the principles of the present invention and showing a plurality of panels and legs in an extended position.
Figure 1A:
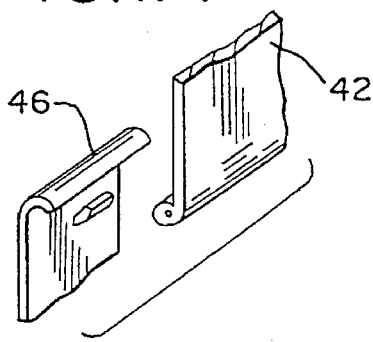
FIG. 1A is a partial enlarged perspective view of the connection between one of the panels and a side wall of the tub.
Figure 1B:
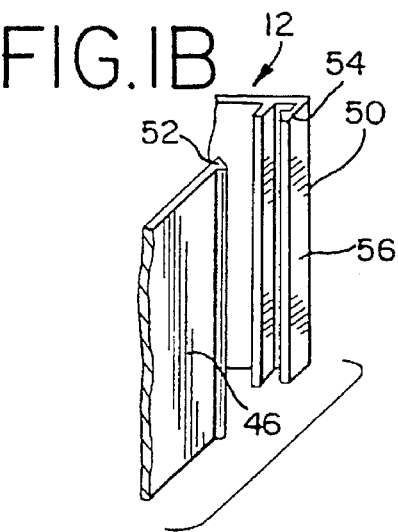
FIG. 1B is a partial enlarged perspective view of the connection between a side panel and a rear panel.

While the present invention is susceptible of embodiment in various forms, there is shown in the drawings and will hereinafter be described preferred embodiments of the invention with the understanding that the present disclosures are to be considered as setting forth exemplifications of the invention which are not intended to limit the invention to the specific embodiment illustrated. Referring now to the drawings, wherein like reference numerals refer to like parts throughout the several views, there is shown in FIG. 1 a pet bathing unit indicated generally at 10. The bathing unit 10 includes a panel assembly 12 and a relatively shallow, rectangular tub 14.

In the illustrated embodiment, the tub 14 is defined by four rigid, vertical side walls 16 projecting upwardly from the rectangular periphery of a rigid bottom wall or floor 18. Preferably, the bottom wall 18 and side walls 16 are made of sheet metal. In order to hold a volume of liquid, the side walls 16 extend completely around the periphery of the bottom wall 18. Preferably, the bottom wall 18 is divided into four sloped sections 20 which intersect at an outlet opening or drain 22 disposed in the middle of the tub 14. As will be appreciated, the drain 22 is located at the lowermost portion of the bottom wall 18 so that liquid flows downwardly by gravity into the drain 22.

Figure 2:
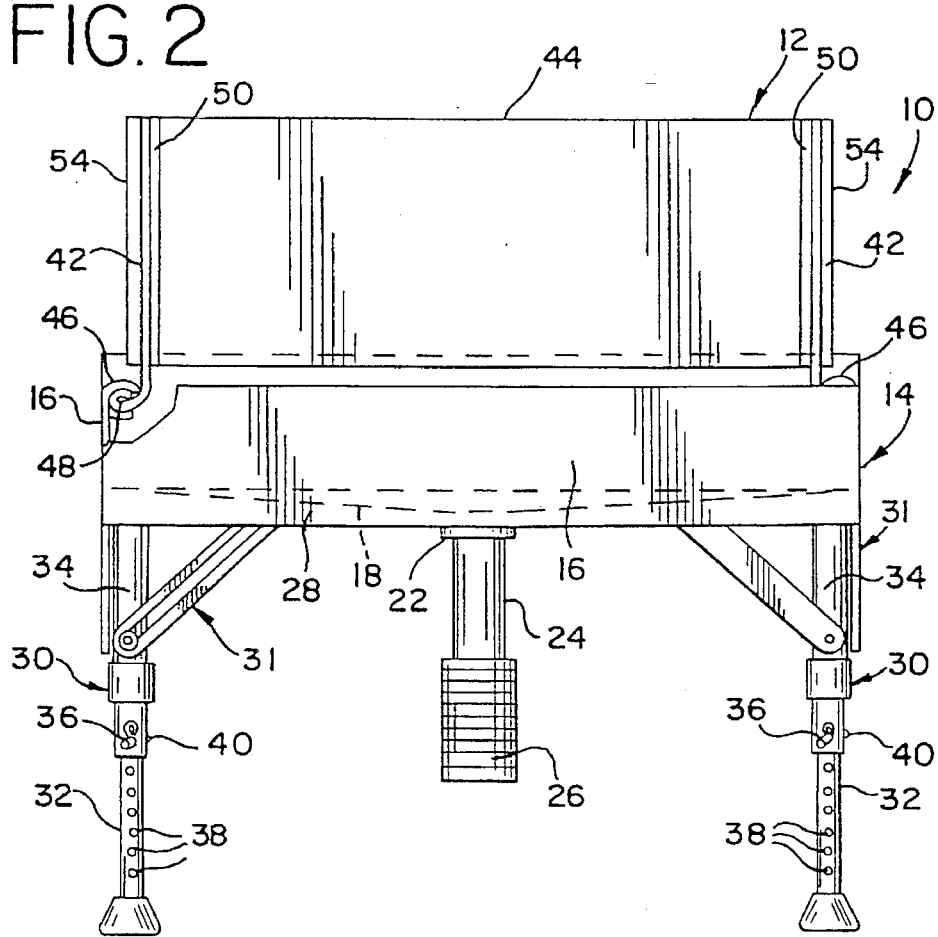
FIG. 2 is a front elevational view of the bathing unit shown in FIG. 1.

As shown in FIG. 2, a conduit 24 is removably connected to and normally depends from the drain 22 so that liquid is directed to a desired location such as the ground or a drain in the floor of a home or bathtub. Preferably, the conduit 24 is made of stainless steel and is threadably connected to the drain 22. In addition, a screen 26 is removably attached as with a clamp or other suitable device to an end of the conduit 24 to collect fur and other debris that drains from the tub 14 concurrently with the water. Thus, the drains in a home or bathtub can remain relatively clog-free because only filtered water and soap will exit the bathing unit 10. The screen 26 can also be easily cleaned by simply detaching it from the conduit 24 and removing the fur and debris preferably before the unit 10 is reused.

Figure 4:
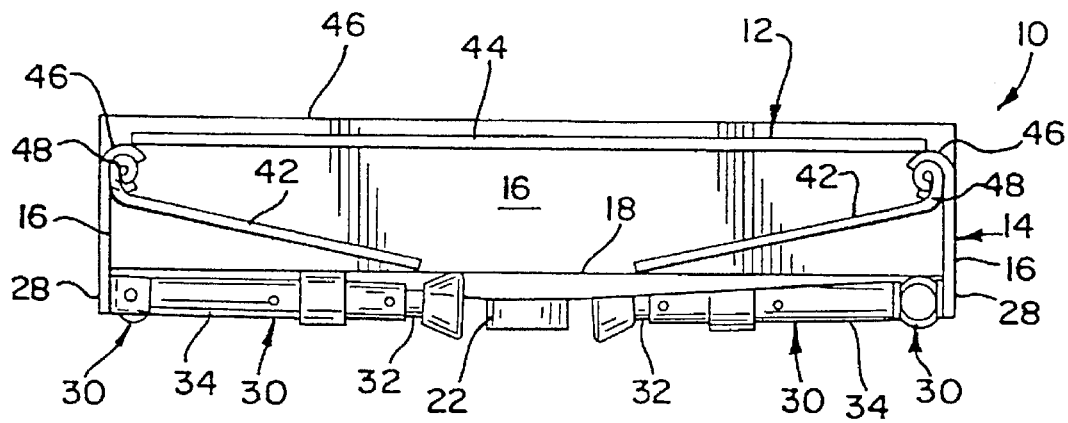
FIG. 4 is a front elevational view of the bathing unit showing the panels and legs in a collapsed storage position with a front wall of the tub removed for clarity.

In the embodiment schematically illustrated in FIG. 1, 2 and 4, a lower portion 28 of each side wall 16 extends beneath the underside of the bottom wall 18. The bathing unit 10 further includes a plurality of elongated legs 30 for supporting the tub 14 in a generally horizontal operational position. In a preferred form of the invention, four legs 30 are used to support the tub 14. Each leg 30 is preferably connected to an interior surface of the side wall lower portions 28. As shown, the legs 30 are attached generally at the junctures of the side walls 16 by conventional slide pin mechanisms 31 which are well known in the art. Thus, the support legs 30 are pivotable between an extended support position as shown in FIGS. 1 and 2, and a collapsed storage position as shown in FIG. 4. In a most preferred form of the invention, the support legs 30 are individually removable and adjustable in length. To allows the legs 30 to be extended or completely detached, a lower section 32 of each leg 30 is telescopically received by an upper section 34 thereof. Each upper section 34 of each leg 30 has a locating hole 36 extending transversely therethrough, and each lower section 32 has a plurality of vertically spaced holes 38 therein. The lower sections 32 are therefore locked in a desired location relative to the upper sections 34 by aligning one of the holes 38 with the locating hole 36 and inserting a locking pin 40 therethrough.

In the embodiment illustrated in FIGS. 1–5, the panel assembly 12 includes two opposing rigid side panels 42 and a rigid rear panel 44. Each panel 42, 44 is pivotally connected to a corresponding side wall 16 of the tub 14. As shown in FIGS. 1–5, the side panels 42 are connected to the laterally disposed side walls 16, and the rear panel 44 is connected to the side wall 16 disposed at the rear of the tub 14. Preferably, the panels 42 and 44 are made of an elastomeric material such as polypropylene or the like.

Figure 3:
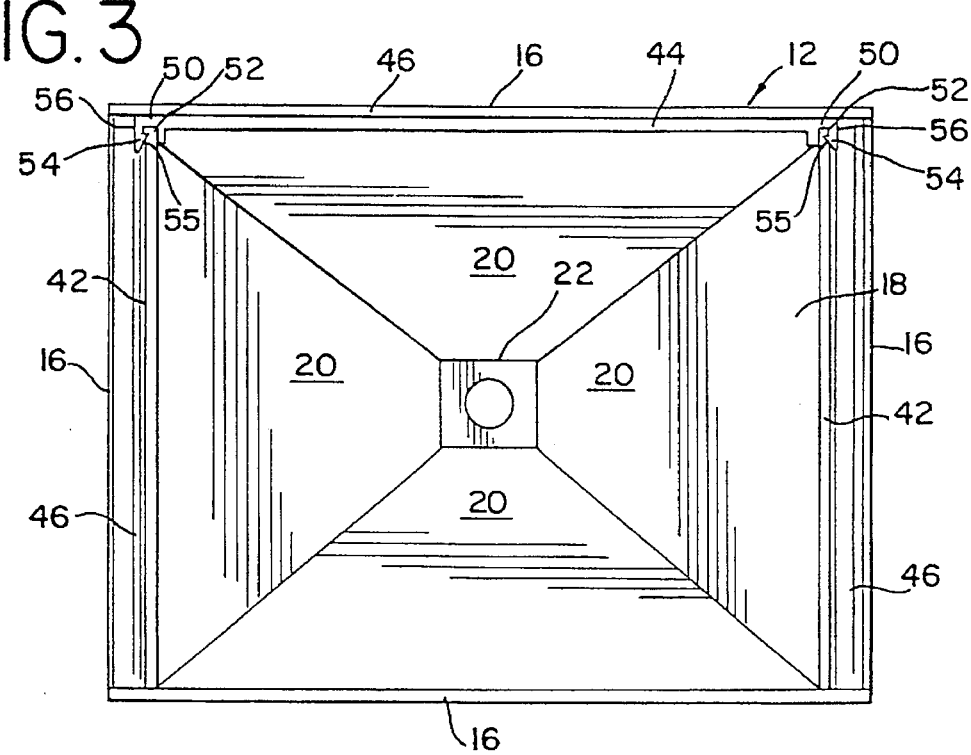
FIG. 3 is a top plan view of the bathing unit shown in FIG. 1.
Figure 5:
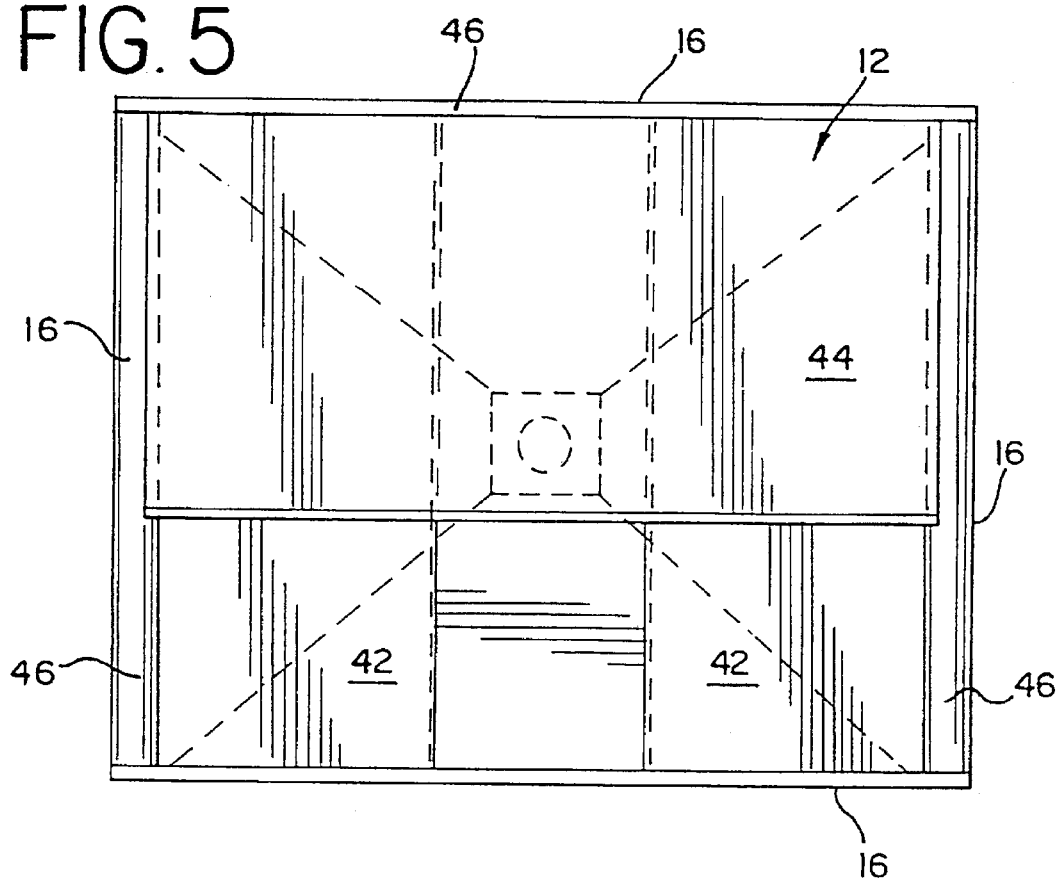
FIG. 5 is a top plan view of the bathing unit shown in FIG. 4.

As shown in FIG. 2, the rear and laterally disposed side walls 16 of the tub 14 each have a curl-shaped upper edge 46. Each of the panels 42 and 44 has a complementary roll-shaped lower edge 48 which releasably fits within the corresponding side wall curled edge 46. Thus, the complementary edges 46 and 48 define a pivotal connection therebetween that allow the panels to move or roll relative to the respective side walls 16 of the tub 14. The panels 42 and 44 are therefore movable between a vertical extended position as shown in FIGS. 1–3, and a lowered storage position as shown in FIGS. 4–5.

When the panels 42 and 44 are in an extended position as shown in FIGS. 1 and 2, the front area of the bathing unit 10 remains open to allow both entry of a pet and access to the pet within the bathing unit. To achieve a completely collapsed bathing unit 10 as shown in FIGS. 4–5, the opposing side panels 42 are pivoted downwardly until they contact the bottom wall 18 of the tub 14. The rear panel 44 is then pivoted downwardly until it contacts the upper edges 46 of the tub side walls 16. In the collapsed position shown in FIG. 4, the panels 42 and 44 are disposed entirely within the area defined by the side walls 16 of the tub 14. If it is desired to place other removable components of the bathing unit 10 inside the tub 14 for storage or transport, the panels 42 and 44 can collapse so that they are flush with the upper edges 46 of the side walls 16. A fastening device can also be provided for securing the panels 42 and 44 to create a simple box-like structure which is easy to transport and store.

Preferably, the side panels 42 and rear panel 44 are interconnected when in the extended position. In the illustrated embodiment, a channel 50 is formed on the interior of rear panel 44 adjacent each side edge thereof. As shown, each channel 50 is defined between inner and outer resilient legs 53 and 54 protruding forwardly from the inner surface of panel 44. When rear panel 44 is in an extended position, each channel 50 receives a lengthwise rear edge portion 52 of a respective side panel 42. Preferably, each resilient outer leg 54 on panel 44 is provided with a catch 55 that releasably engages an elongated complementary shaped notch 56 formed toward the rear edge of each side panel 42. Thus, when arranged in the extended position, the panels 42 and 44 are releasably locked into a rigid, upright assembly which can withstand the impact of an unruly animal.

In the embodiment shown in FIG. 1, a removable shower head or hand wand 57 is mounted to the panel assembly, and a wash hose 58 is mounted on a hook 60 which is attached to the panel assembly. In order to wash an animal in the bathing unit 10, the shower head 57 and hose 58 are connected to a water supply (not shown).

When the bathing unit 10 is completely collapsed as shown in FIG. 4, a ready-to-use unit is provided which is easily transported and stored. Preferably, the legs 30, drain hose 24, wash hose 58, and shower head 57 are all detachable and captively held inside the tub 14 when in the collapsed position to facilitate transport and storage. Thus, the bathing unit 10 folds down to substantially the size of the tub 14, which is preferably about 4 feet long, about 2 feet wide, and about 7 inches high.

It will be appreciated that only one of the shower head and hose need be provided, and that these components can be attached to any portion of the bathing unit 10 in addition, water delivery may be provided by a device such as a garden hose external to the bathing unit 10.

Figure 6:
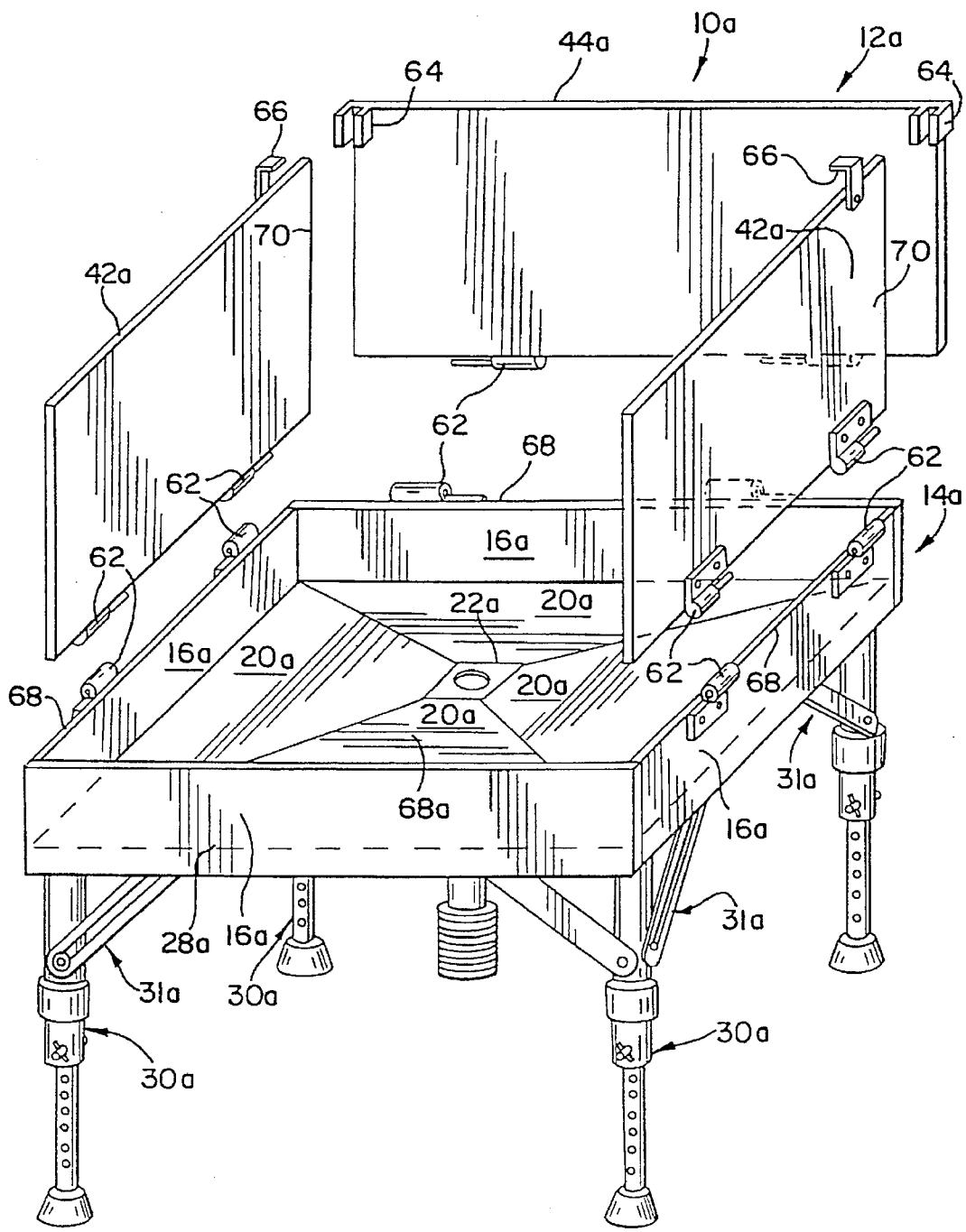
FIG. 6 is an exploded perspective view of an alternative embodiment of the invention showing the legs and panels removably detached from the tub.

Referring now to FIG. 6, the reference numeral 10a designates an alternative embodiment of the present invention. Since embodiment 10a has portions similar to the previously described embodiment 10, similar parts appearing in FIG. 6 are represented by the same, corresponding reference numeral, except for the suffix "a" in the numerals of the latter. In this embodiment, the panels 42a and 44a are pivotally attached to the corresponding side walls 16a of the tub 14a by a plurality of slip pin hinges 62. Thus, the panels 42a and 44a can be easily detached from the tub 14a if desired. In addition, a plurality of tabs 64 extend forwardly from the rear panel 44a, and a clip 66 is pivotally attached to each side panel 42a in order to interlock the panels when in the extended position.

To prevent liquid from escaping the bathing unit 10a, a gasket-like seal 68 is provided on the upper edge of the side walls 16a of the tub 14a. A similar seal 70 is provided on the rear edge of the side panels 42a.

While the foregoing embodiment is illustrated for purposes of disclosure, it is contemplated that other tubs having different constructions and types of drains and support legs may be utilized within the scope of the invention. For example, the tub can be generally triangularly shaped and provided with only three legs for support. Various types of mechanisms can also be provided to allow pivoting, detachment, or extension of the support legs. Rather than providing a screen at the end of a conduit for collecting fur and debris, a horizontal grate or platform can be placed over the sloped bottom wall. A rubber mat can also be attached to a rear underside of the bottom wall so that the rear legs can be removed and the unit rested on a counter or the like. In addition, the bottom wall can be horizontal or configured with any number of sloping surfaces and corresponding drains. For example, the drain can be positioned in one of the side walls 16 of the tub 14. The drain conduit can also be made of a flexible material such as rubber.

Thus, an open-top pet bathing unit is provided which is collapsible and compact for easy transport and storage.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A unit for bathing an animal comprising:

a rigid base portion having an upwardly projecting peripheral wall extending completely thereabout to define a relative shallow tub for supporting an animal; and a panel assembly hingedly attached to an upper edge of said peripheral wall, said panel assembly being movable between an upwardly projecting extended position to define an open sided enclosure within which the animal can be contained for bathing, and a collapsed storage position to facilitate storage and transportation of said unit;

said unit having a drain.

2. The animal bathing unit according to claim 1 wherein said base portion includes a drain.

3. The animal bathing unit according to claim 2 wherein said drain has said conduit removably connected thereto.

4. The animal bathing unit according to claim 1 further comprising at least two elongated legs depending from said base portion and positioned adjacent the open side of said enclosure.

5. The animal bathing unit according to claim 1 further comprising at least three elongated legs depending from said base portion, said legs being movable between an extended position, wherein said legs support said base portion in an elevated position, and a storage position, wherein said legs are collapsible relative to said base portion to facilitate storage of said unit.

6. The animal bathing unit according to claim 1 wherein said panel assembly comprises a plurality of generally planar panels, each panel being operably connected along one edge thereof to said base portion peripheral wall.

7. The animal bathing apparatus according to claim 6 wherein said panels are adapted to interconnect when in the extended position.

8. An open-top animal bathing unit being collapsible and compact for storage, said unit comprising:

a generally rectangular rigid base portion having an upwardly projecting peripheral wall extending completely thereabout to define a relatively shallow tub that supports an animal;

at least three elongated legs depending from said base portion, said legs being movable between an extended position, wherein said legs support said unit in an elevated position, and a storage position, wherein said legs are collapsible relative to said base portion to facilitate storage of said unit; and three generally planar panels operably connected along one edge thereof to respective sections of said base portion peripheral wall, said panels being movable between an extended position, wherein said panels extend upwardly about the periphery of said base unit and interconnect with each other to define an open-sided enclosure within which the animal can be contained for bathing, and a storage position, wherein said panels are collapsible relative to said base portion to facilitate storage of said unit.

9. The animal bathing unit according to claim 8 wherein said base unit includes a drain.

10. The animal bathing unit according to claim 9 further comprising a conduit removably connected to the drain and a screen removably connected to a terminal end of the conduit said unit having a drain.

11. The animal bathing unit according to claim 8 wherein the length of each elongated leg is adjustable.

12. The animal bathing unit according to claim 8 wherein said elongated legs are removably connected to said base portion to permit said legs to be removed from said base portion when said legs are in said storage position.

13. The animal bathing unit according to claim 8 further comprising a wash hose.

14. The animal bathing unit according to claim 8 further comprising a shower head.

15. The animal bathing unit according to claim 8 wherein said elongated legs are connected to said base portion by structure permitting said legs to pivot between said storage position and said extended position.

16. The animal bathing unit according to claim 8 wherein said panels are connected to said base unit by structure permitting said panels to pivot between said storage position and said extended position.

17. The animal bathing unit according to claim 8 further comprising structure for interconnecting said panels along adjacent edges thereof.

18. The animal bathing unit according to claim 8 further comprising seals between adjacent edges of said panels for preventing liquid from escaping said unit between said panels.

19. The animal bathing unit according to claim 8 further comprising seals between said panels and edges of the periphery of said base portion for preventing liquid from escaping said unit when said panels are in said extended position.

20. An open-top pet bathing unit being collapsible and compact for storage, said unit comprising:

a generally rectangular tub for holding a volume of liquid and having a rigid base being capable of supporting a pet;

a drain suitably positioned in said tub to allow liquid to escape said tub;

a drain conduit removably connected to said drain;

two opposing rigid side panels being movable between an extended position, wherein said side panels are operably connected to opposite sides of said tub and extend upwardly above said tub, and a storage position, wherein said side panels are collapsible relative to said tub to facilitate storage;

a rigid rear panel being movable between an extended position, wherein said rear panel extends upwardly above said tub and is interconnected to said side panels in their said extended position to define an open-sided enclosure within which the pet can be contained during bathing, and a storage position, wherein said rear panel is collapsible relative to said tub to facilitate storage; and at least three elongated and adjustable legs depending from said tub, said legs being movable between an extended position, wherein said legs elevate and support said unit, and a storage position, wherein said legs are collapsible relative to said tub to facilitate storage.

* * * * *